Nov. 4, 1958
B. J. GARVEY ET AL
2,859,267
PRIMARY CELL
Filed Feb. 15, 1955
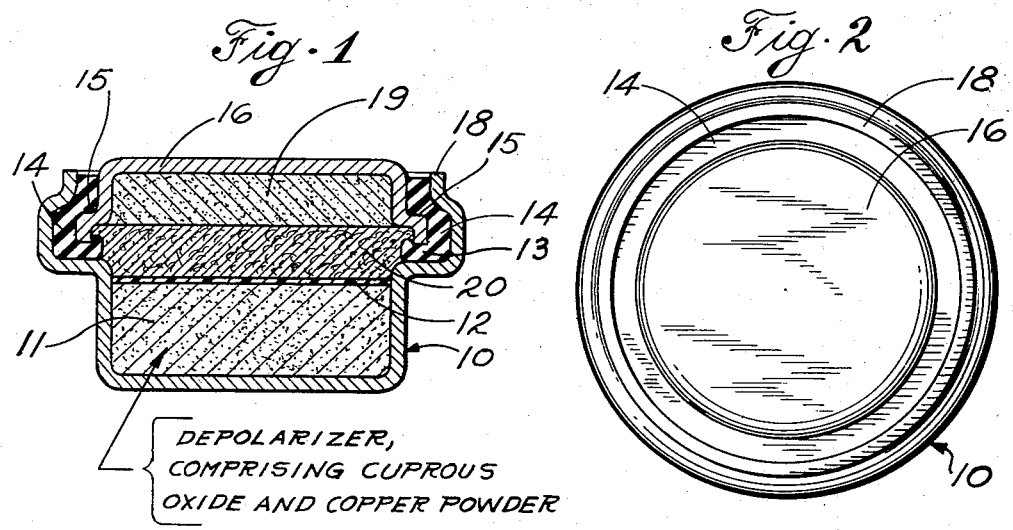
Fig. 1
Fig. 2
DEPOLARIZER, COMPRISING CUPROUS OXIDE AND COPPER POWDER
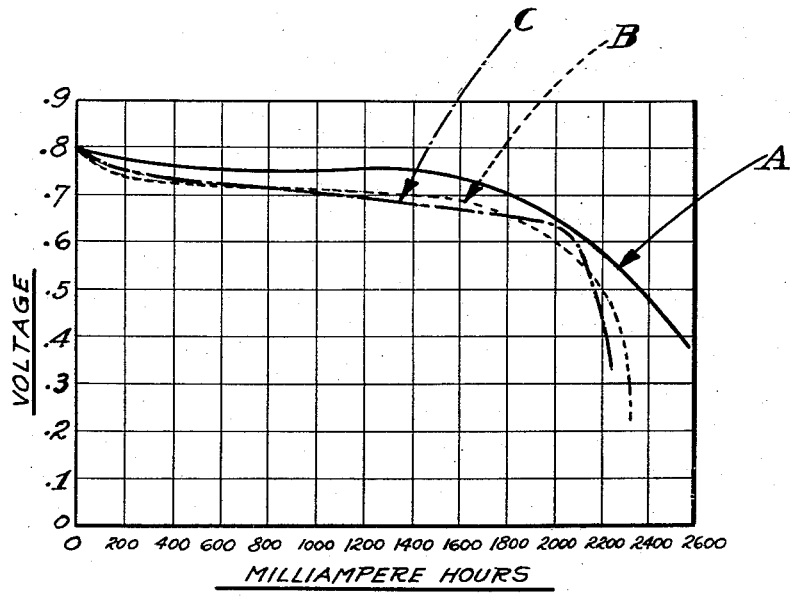
Fig. 3
INVENTORS
BRUCE J. GARVEY
& CHARLES SCHAEF.
BY Bosworth, Sessions,
Herretron + Lawler
ATTORNEYS

United States Patent Office 2,859,267
Patented Nov. 4, 1958

2,859,267

PRIMARY CELL

Bruce J. Garvey, Cleveland, and Charles Schaef, Olmsted Falls, Ohio, assignors, by mesne assignments, to P. R. Mallory & Co. Inc., Indianapolis, Ind., a corporation of Delaware Application February 15, 1955, Serial No. 488,198

8 Claims. (Cl. 136—115)

This invention relates to primary electric cells and more particularly to dry cells of the alkaline type and depolarizers for such cells.

A general object of the invention is the provision of alkaline primary cells which have a lower initial voltage than the usual alkaline cell and in which the voltage is maintained at a level reasonably near the initial voltage throughout the service life of the cells. Another object is the provision of such cells which have superior service and shelf life characteristics and in which local battery action and resulting corrosion of the zinc electrode are minimized. Another object is the provision of a depolarizer for such cells. Further objects and advantages of the invention will become apparent from the following description of a preferred form thereof, reference being made to the accompanying drawings.

The present invention is particularly adapted to primary cells of the type embodying zinc anodes, an alkaline electrolyte such as a solution of potassium hydroxide and a depolarizer or depolarizing electrode comprising an electrolytically reducible metallic oxide. Most cells of this type embody depolarizers composed of mercuric oxide. It has also been proposed to use various other metallic oxides, including oxides of copper, in such cells. Cells with depolarizers composed of cupric oxide (CuO) have given trouble because cupric oxide is slightly soluble in the electrolyte; the dissolved copper migrates to the zinc electrode where it is deposited as metallic copper, producing local battery action which results in corrosion and destruction of the zinc.

Cells with depolarizers of cuprous oxide ($Cu_2O$) have also been proposed; such cells are advantageous for certain purposes because they produce a substantially lower voltage than cells with mercuric oxide or cupric oxide depolarizers. However, prior to the present invention, so far as we are aware, cells with cuprous oxide depolarizers have not been manufactured commercially to any substantial extent. Heretofore, such cells have been subject to difficulties because of migration of copper to the zinc and consequent local battery action.

Furthermore, the curves of discharge voltage against time for such cells in the past have always exhibited an initial portion showing higher discharge voltages than those associated with cuprous oxide itself and accordingly the cells have not been suitable for certain services where low voltage is required. Our investigations indicate that these difficulties arise for the reason that the cuprous oxide used in the depolarizers, even though quite pure initially, contains small but appreciable amounts of cupric oxide when incorporated in completed cells. Moreover, our investigations indicate that these difficulties also apparently occur because cuprous oxide, when wet with electrolyte and exposed to air, oxidizes quite readily to cupric oxide. Thus, oxidation of some of the cuprous oxide to cupric oxide has unavoidably occurred during assembly of the cells. The presence of this cupric oxide, however formed, causes the initial voltage of the cells to be higher than desired and also results in the precipitation of metallic copper on the zinc electrode, followed by local battery action and corrosion of the zinc.

According to the present invention, these difficulties are eliminated and cells having a desired low initial voltage, good service life and good shelf life are produced by using depolarizers in which the metallic ingredients consist essentially of cuprous oxide ($Cu_2O$) and a small percentage of finely divided metallic copper. Preferably, the depolarizer also contains the usual finely divided graphite. The finely divided copper powder apparently prevents the oxidation of the cuprous oxide to cupric oxide or reduces to cuprous oxide any cupric oxide that may be formed. In any event, depolarizers and cells made according to our invention contain no substantial amounts of cupric oxide initially or after shelf life or service. Cuprous oxide is less soluble in the electrolyte than cupric oxide, so that difficulties due to local battery action are substantially eliminated, and sinc the formation of cupric oxide is prevented, the voltage of the cells remains at the desired low level.

Referring to the drawings, Figure 1 is a cross-sectional view, on an enlarged scale, through a preferred form of primary cell embodying the invention, the thickness of certain parts being exaggerated for convenience in illustration.

Figure 2 is a top plan view of the cell of Figure 1, and

Figure 3 is a chart showing typical voltage curves of cells made according to our invention.

As shown in Figures 1 and 2, a preferred form of cell embodying the invention may comprise a steel container 10 having a mass of depolarizer 11 pressed therein. Depolarizer 11 preferably consists of about 80 percent by weight of finely divided cuprous oxide, about 5 percent by weight of finely divided metallic copper and about 15 percent by weight of finely divided graphite, the graphite being the type ordinarily used in depolarizers for alkaline cells, the constituents being mixed together as is conventional in the production of depolarizers. As explained below, these percentages are not critical and may be varied within rather wide limits.

Above the depolarizer there is a barrier layer 12 composed of porous polyvinyl chloride or other suitable porous plastic material. This layer is conventionally disposed just below the shoulder 13 of the container 10. The shoulder 13 provides a seat for sealing ring 14 composed of rubber or other suitable elastic insulating material which is channeled to receive the flange 15 of the steel cap 16, the rubber being compressed against the shoulder 13 by flange 15 and held firmly in place by the inwardly turned flange 18 of the container 10.

The steel cap 16 is preferably tin plated and contains the zinc electrode 19, which may take any convenient form such as a compressed mass of amalgamated zinc powder, amalgamated zinc foil, or the like. An alkali-resistant paper separator 20 or other suitable separator is interposed in the usual manner between the zinc electrode 19 and the porous barrier 12. The paper, the zinc electrode, the porous barrier and the depolarizer are all permeated by the electrolyte, which preferably comprises a solution of potassium hydroxide containing zinc, ordinarily in the form of zinc oxide.

Cells constructed as described give a maximum initial voltage under open circuit conditions of about 0.90 volts. The voltage drops rather quickly in initial service to about 0.75 volts and depending upon the rate of discharge, this voltage is maintained with a range of about one tenth of a volt throughout the major portion of the service life of the cells. There is no increase in voltage and no evidence of any substantial local battery action on the zinc electrodes during construction and shelf life of the cells.

The curves making up Figure 3 of the drawing illustrate the results obtainable in service with small cells containing about 7.5 grams of depolarizer made according to the present invention. Curve A shows the results of the discharge of a cell through an 88 ohm load resistor. The open circuit voltage of the cell initially was 0.89, and the voltage across the 88 ohm resistor was 0.80 volts. Under these conditions the voltage dropped rather rapidly to a value slightly over 0.75 volts and then fell off very gradually until after 1600 milliampere hours, the voltage began to drop more precipitously. However, the voltage did not fall below 0.65 volts until the discharge had reached 2000 milliampere hours.

Curve B shows the results of the discharge of a cell of the same type through a load resistor of 50 ohms. The curve is generally similar to curve A, except that the initial voltage drop was slightly greater and the voltage had fallen to 0.60 volts at 2000 milliampere hours.

Curve C shows the discharge of a similar cell through a load resistor of 35 ohms. Here the voltage dropped gradually and at a substantially uniform rate from 0.75 volts at 100 milliampere hours to 0.63 volts at 2000 milliampere hours. Thereafter the voltage fell sharply. In this case, as in the other curves, the voltage was maintained at a voltage near the original load voltage throughout substantially the entire service life of the cell.

Cells embodying the present invention can be made according to conventional constructions, using conventional zinc anodes and conventional alkaline electrolytes. The percentages of the various materials in the depolarizer are not highly critical. Five percent by weight of the copper powder appears to give superior results, but the percentage can be varied from two to eight or more. Lesser percentages of copper powder may be insufficient to prevent the oxidation of some of the cuprous oxide to cupric oxide. Greater percentages of copper powder may be employed, but the presence of copper in amounts in excess of that required to prevent oxidation may have the effect of reducing the service life of the cells. Preferably, from 10 percent to 20 percent of graphite is employed; lesser percentages may be utilized, but with lesser percentages the depolarizer material cannot readily be compacted into a coherent mass such as is desirable for production convenience; greater percentages result in reduction of the service life of the cells. Thus, the preferred ranges for the components of the depolarizer are approximately 72 to 88 percent by weight of cuprous oxide, approximately 2 to 8 percent by weight of copper powder and approximately 10 to 20 percent by weight of finely divided graphite. The copper powder is thus preferably within the range of from about 2¼ percent to about 11 percent by weight of the cuprous oxide present in the depolarizer with about 6 percent giving excellent results. As stated above, however, the percentages are not critical.

From the foregoing description of a preferred form of the invention, it will be seen that the invention provides primary cells having an initial low voltage per cell, which is maintained with a relatively slight decrease throughout the entire service life of the cells. The cells have good electrical capacity for their mass and have excellent shelf life characteristics inasmuch as they are not subject to substantial internal battery action or other factors which result in the destruction of the zinc electrodes. In addition to preventing the formation of cupric oxide, the copper powder has the additional advantageous effect of increasing the conductivity of the depolarizer as compared to conventional depolarizers.

Those skilled in the art will appreciate that various changes in the construction of the cells and adaptations of the invention to other types of cells and batteries can be made without departing from the spirit and scope of the invention. The essential characteristics of the invention are summarized in the appended claims.

We claim:

1. A depolarizer for an alkaline primary cell comprising a mixture of approximately 72 to 88 percent by weight of cuprous oxide, approximately 2 to 8 percent by weight of copper powder and approximately 10 to 20 percent by weight of carbon.

2. A depolarizer for an alkaline primary cell, said depolarizer, at the time that the cell is put into service, consisting essentially of a mixture of finely divided cuprous oxide, finely divided metallic copper and finely divided carbon, the metallic copper constituting from 2 to 8 percent by weight of the depolarizer.

3. A depolarizer according to claim 2 wherein the metallic copper is approximately 5 percent by weight of the depolarizer.

4. A depolarizer according to claim 3 wherein the carbon consists of graphite.

5. A depolarizer according to claim 4 wherein the graphite is from 10 to 20 percent by weight of the depolarizer.

6. An alkaline primary cell comprising a metal anode, a depolarizer, a permeable spacer separating said anode from said depolarizer, and an alkaline electrolyte permeating said anode, spacer and depolarizer, the metallic constituents of said depolarizer at the time that the cell is put into service consisting essentially of a mixture of finely divided cuprous oxide and finely divided metallic copper, the metallic copper being approximately 2¼ to 11 percent by weight of the cuprous oxide.

7. An alkaline primary cell according to claim 6 wherein the anode is composed of amalgamated zinc.

8. An alkaline primary cell according to claim 7 wherein finely divided graphite is incorporated in the depolarizer.

References Cited in the file of this patent

UNITED STATES PATENTS

| | | |
|---|---|---|
| 479,887 | Lalande | Aug. 2, 1892 |
| 871,214 | Edison | Nov. 19, 1907 |
| 1,015,734 | Heuser | Jan. 23, 1912 |
| 1,289,366 | Benner et al. | Dec. 31, 1918 |
| 1,548,539 | Martus et al. | Aug. 4, 1925 |
| 2,463,565 | Ruben | Mar. 8, 1949 |